United States Patent
Yamamoto et al.

(10) Patent No.: US 12,307,017 B2
(45) Date of Patent: May 20, 2025

(54) HAPTIC TOUCH PANEL DISPLAY

(71) Applicant: Sharp Display Technology Corporation, Kameyama (JP)

(72) Inventors: Takuma Yamamoto, Kameyama (JP); Yasuhiro Sugita, Kameyama (JP); Shinji Yamagishi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/522,626

(22) Filed: Nov. 29, 2023

(65) Prior Publication Data

US 2024/0231498 A1 Jul. 11, 2024

(30) Foreign Application Priority Data

Jan. 5, 2023 (JP) ................. 2023-000727

(51) Int. Cl.
*G06F 3/01* (2006.01)
*G06F 3/041* (2006.01)
*G06F 3/04886* (2022.01)
*G06F 3/14* (2006.01)

(52) U.S. Cl.
CPC ............ *G06F 3/016* (2013.01); *G06F 3/0416* (2013.01); *G06F 3/14* (2013.01); *G06F 3/04886* (2013.01)

(58) Field of Classification Search
CPC .......... G06F 3/016; G06F 3/0416; G06F 3/14; G06F 3/04886
See application file for complete search history.

(56) References Cited

U.S. PATENT DOCUMENTS

| | | | |
|---|---|---|---|
| 2011/0141052 A1* | 6/2011 | Bernstein | G06F 3/041 341/5 |
| 2013/0222267 A1* | 8/2013 | Almalki | G06F 3/04164 345/173 |
| 2019/0101988 A1* | 4/2019 | Kang | G06F 3/03547 |
| 2023/0034240 A1* | 2/2023 | Son | G06F 3/016 |

FOREIGN PATENT DOCUMENTS

JP    2011-002926 A    1/2011

* cited by examiner

*Primary Examiner* — Brent D Castiaux
(74) *Attorney, Agent, or Firm* — ScienBiziP, P.C.

(57) ABSTRACT

A haptic touch panel display includes: a display panel; a touch panel disposed on an upper surface of the display panel or in the display panel; a back bezel configured to support a lower surface of the display panel; a plurality of actuators; and a plurality of rigid bodies disposed between the back bezel and the plurality of actuators, each of the plurality of rigid bodies being positioned between one of the plurality of actuators and the back bezel.

10 Claims, 13 Drawing Sheets

HAPTIC TOUCH PANEL DISPLAY

CROSS-REFERENCE TO RELATED APPLICATIONS

This application claims the benefit of priority to Japanese Patent Application Number 2023-000727 filed on Jan. 5, 2023. The entire contents of the above-identified application are hereby incorporated by reference.

BACKGROUND

Technical Field

The disclosure relates to a haptic touch panel display.

In order to provide a user with good operability, a touch panel display panel having a haptic function has been developed. For example, JP 2011-002926 A discloses a display device with a haptic function that can present a satisfactory visual sensation and haptic sensation.

SUMMARY

An object of the disclosure is to provide a touch panel display with a haptic function that can present a satisfactory haptic sensation with fewer actuators.

A haptic touch panel display according to an embodiment of the disclosure includes a display panel, a touch panel disposed on an upper surface of the display panel or in the display panel, a back bezel configured to support a lower surface of the display panel, a plurality of actuators, and a plurality of rigid bodies disposed between the back bezel and the plurality of actuators, each of the plurality of rigid bodies being positioned between one of the plurality of actuators and the back bezel.

According to an embodiment of the disclosure, a touch panel display with a haptic function that can present a satisfactory haptic sensation with fewer actuators is provided.

BRIEF DESCRIPTION OF DRAWINGS

The disclosure will be described with reference to the accompanying drawings, wherein like numbers reference like elements.

DESCRIPTION OF EMBODIMENTS

Figure 1:
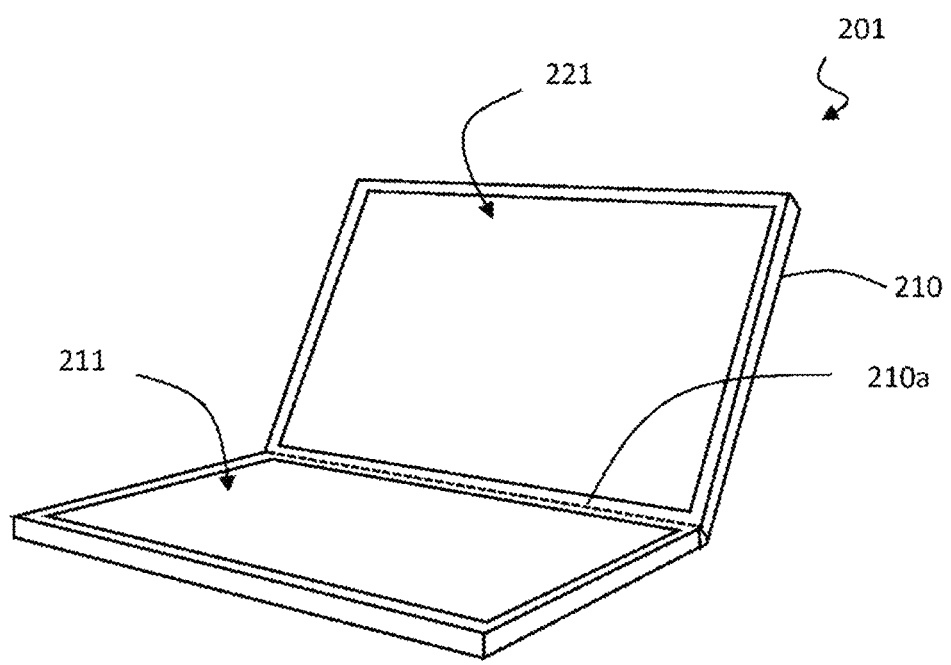
FIG. 1 is a perspective view schematically illustrating the appearance of a personal computer according to a first embodiment.

Various touch panel displays that can present a haptic sensation have been realized. For example, in a smartphone or the like, haptic presentation in a manner of vibrating the entire display is adopted. On the other hand, in the case of a touch panel display on which operation is performed using a plurality of fingers on a relatively large screen, as in a case where a software keyboard is used, when the entire touch panel display vibrates, vibration is also transmitted to a finger, a palm, or the like that erroneously comes into contact with the touch panel display. In this case, it is difficult for an operator to identify which contact is recognized by the touch panel display as input operation.

For this reason, in a touch panel display used for such an application, only the periphery of a finger in contact is preferably vibrated, and a plurality of actuators are preferably disposed in the touch panel display. The inventors of the present application have found through detailed investigation that, when actuators are disposed on the back surface side of a display, vibration caused by the actuators is easily attenuated in the touch panel display due to the thinness of the display and the structure inside the display.

In order to partially vibrate the touch panel display with a sufficient vibration intensity, the actuators are preferably disposed at a high density. On the other hand, an increase in the number of actuators also results in problems such as an increase in cost and complication of a system.

In view of such problems, the inventors of the present application have conceived a novel haptic touch panel display.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for the same portions or portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

First Embodiment

FIG. 1 is a perspective view schematically illustrating the appearance of a personal computer 201 according to the present embodiment. The personal computer 201 includes, for example, a foldable housing 210, and a haptic touch panel display 211 and a display 221 disposed in the housing 210. The display 221 may have a touch panel function and may further have a haptic function. In addition, the haptic touch panel display 211 and the display 221 may be a display integrally constituting one screen. For example, the housing 210 is configured to be foldable and openable about a shaft 210*a*.

Figure 2:
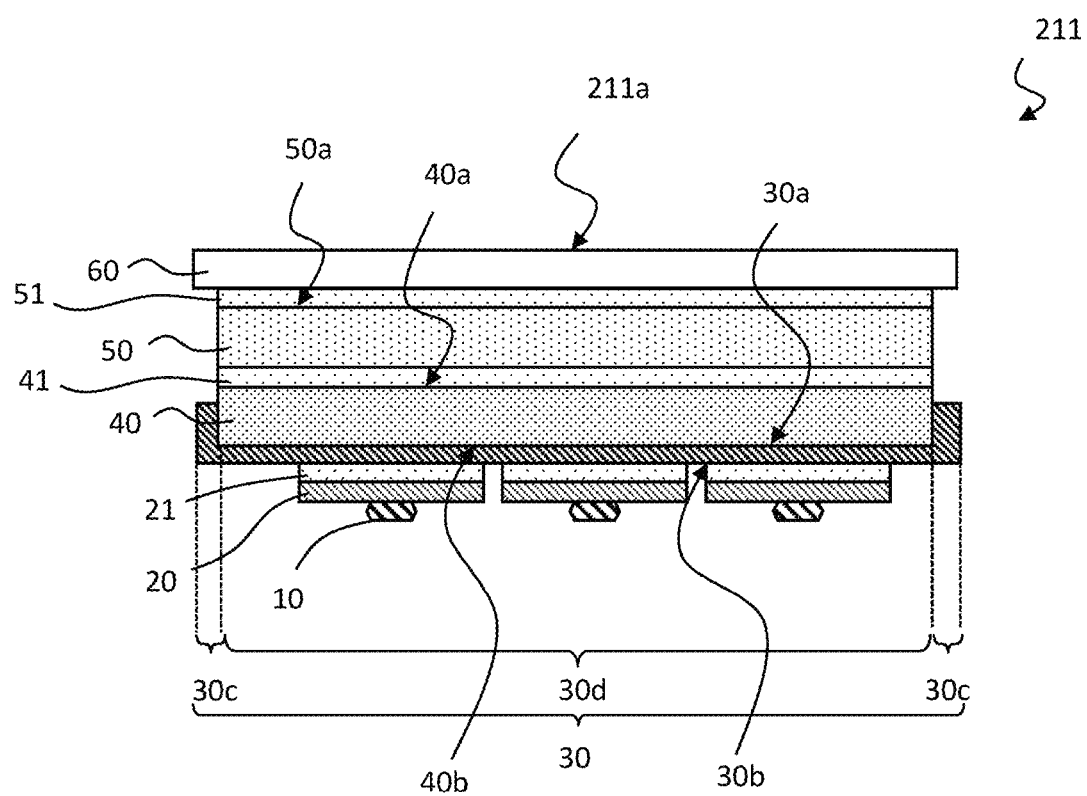
FIG. 2 is a schematic cross-sectional view of a haptic touch panel display according to the first embodiment.

FIG. 2 is a schematic cross-sectional view of the haptic touch panel display 211. The haptic touch panel display 211 includes a display panel 40, a touch panel 50, a back bezel 30, a plurality of actuators 10, and a plurality of rigid bodies 20. The haptic touch panel display 211 may further include a cover plate 60.

The display panel 40 is, for example, a liquid crystal display, an organic EL display, or the like, and a driving method is not particularly limited. The size of the display panel 40 is, for example, 6 inches or more and 15 inches or less.

The touch panel 50 is disposed on an upper surface 40*a* side of the display panel 40. The touch panel 50 detects a position touched by a finger, a touch pen, or the like on a display surface 211*a* of the haptic touch panel display 211. The touch panel 50 may be any of various types of touch panels such as capacitive, resistive, surface acoustic wave, and infrared touch panels. The touch panel 50 may be disposed on the display panel in any one of an in-cell system, an on-cell system, and an out-cell system. That is, a portion or the entirety of the touch panel 50 may be disposed on the upper surface 40*a* of the display panel 40, or may be disposed inside the display panel 40.

In addition, the touch panel 50 may be a touch panel that detects a position and a magnitude of pressing. The touch panel 50 includes, for example, a driving electrode, a position sensing electrode, and a pressing sensing electrode, applies a driving signal to the driving electrode, detects a change in capacitance caused by contact of a finger or the like using the position sensing electrode, and detects a change in capacitance caused by the pressing of a finger or the like using the pressing sensing electrode. Such a touch panel 50 is disclosed in, for example, JP 2021-128511 A. The disclosure of JP 2021-A is incorporated herein by reference.

The cover plate 60 is disposed on an upper surface 50*a* of the touch panel 50. For example, the display panel 40 and the touch panel 50 are bonded to each other by an optically clear adhesive (OCA) 41, and the touch panel 50 and the cover plate 60 are bonded to each other by an OCA 51.

The back bezel 30 supports the display panel 40. The back bezel 30 includes, for example, a frame portion 30*c* and a support portion 30*d*. The support portion 30*d* includes a support surface 30*a* facing a lower surface 40*b* of the display panel 40 and a back surface 30*b* positioned on a side opposite to the support surface 30*a*. The support portion 30*d* has a rectangular shape corresponding to the lower surface 40*b* of the display panel 40.

The frame portion 30*c* has a frame shape surrounding the support portion 30*d*, and the outer edge of the support portion 30*d* is connected to the frame portion 30*c* to thereby give rigidity to the support portion 30*d*.

The back bezel 30 is preferably made of a material having high rigidity. For example, the back bezel 30 is preferably made of a metal such as aluminum or stainless steel. When the back bezel 30 is made of the above-described metal, the thickness of the support portions 30*d* is preferably 0.2 mm or more and 0.5 mm or less.

The actuator 10 is a driver that presents a haptic sensation in the haptic touch panel display 211. As will be described in detail below, the actuator 10 is disposed immediately below the display panel 40, that is, at a position overlapping the display panel 40 in a plan view, and vibrates the haptic touch panel display 211 in the thickness direction.

The actuator 10 is an element that converts electrical energy into mechanical energy by electromechanical conversion, and is specifically a piezoelectric element. For example, one side of a vibration surface of the actuator 10 is preferably approximately 9 mm to 30 mm, and the actuators 10 preferably vibrates at several tens to several hundreds of Hz by applying an AC voltage of approximately 10 V to 100 V.

The rigid body 20 is disposed between the lower surface 40*b* of the back bezel 30 and the actuator 10, and propagates the enlarged vibration of the actuator 10, which can reach an area wider than a vibration region of the actuator 10, to the back bezel 30. In the haptic touch panel display 211, each rigid body 20 is preferably disposed to correspond to one of the plurality of actuators 10 so that a haptic sensation can be presented locally. The rigid body 20 and the back bezel 30 are bonded together by an adhesive 21. The cured adhesive 21 preferably has a high modulus of elasticity.

Similarly to the back bezel, the rigid body 20 is preferably made of a material having high rigidity. For example, the rigid body 20 is preferably made of a metal such as aluminum or stainless steel, a ceramic, or the like. More preferably, the material constituting the rigid body 20 is harder, that is, has a higher Young's modulus than the material constituting the back bezel 30. When the rigid body 20 is made of the above-described metal, the thickness of the rigid body 20 is preferably 0.2 mm or more and 1.0 mm or less. The actuator 10 is also bonded to the rigid body 20 by the adhesive 11.

Figure 3:
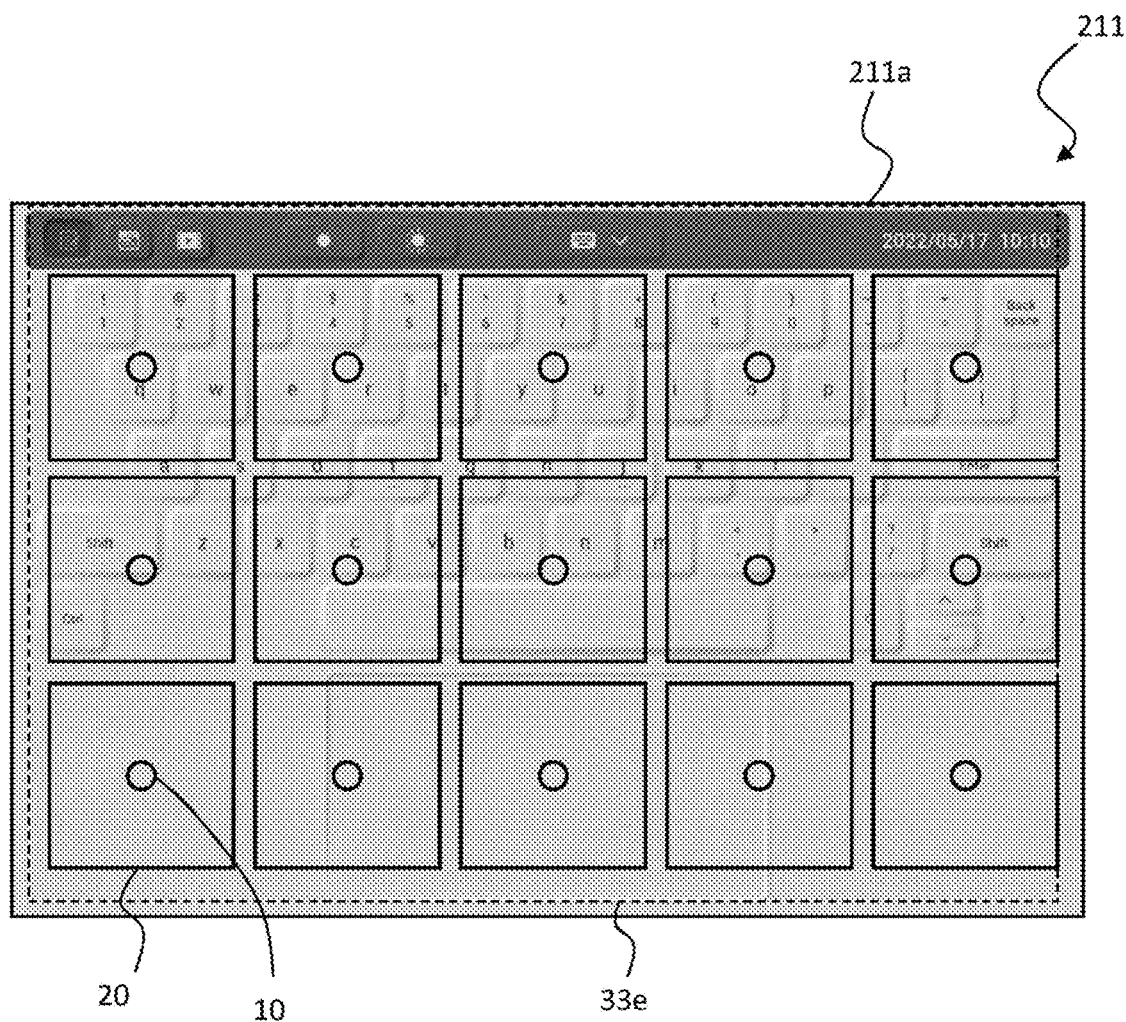
FIG. 3 illustrates an example of the arrangement of rigid bodies and actuators in a state where a keyboard image is displayed on the haptic touch panel display.

FIG. 3 illustrates an example of the arrangement of the rigid bodies 20 and the actuators 10 in a state where a keyboard image is displayed on the display panel 40 of the haptic touch panel display 211. When the haptic touch panel display 211 of the present embodiment is used as, for example, a software keyboard, the haptic touch panel display 211 presents a haptic sensation to a finger in contact with a key. For this reason, the number and arrangement of the actuators 10 and the shape, size and arrangement of the rigid bodies are determined in accordance with the size of the key, an arrangement pitch of the key, and the position of the key.

For example, in the present embodiment, the actuators are disposed in three rows and five columns for a 13-inch screen. The shape of the rigid body 20 in a plan view is a quadrangle and is, for example, a square with one side of 60 mm. The plurality of rigid bodies 20 are independent of each other. A gap having a width of 1.0 mm to 3.0 mm and extending in the arrangement direction is provided between a pair of adjacent rigid bodies 20. The actuator 10 is disposed at the center of the rigid body 20 in a plan view.

Figure 4:
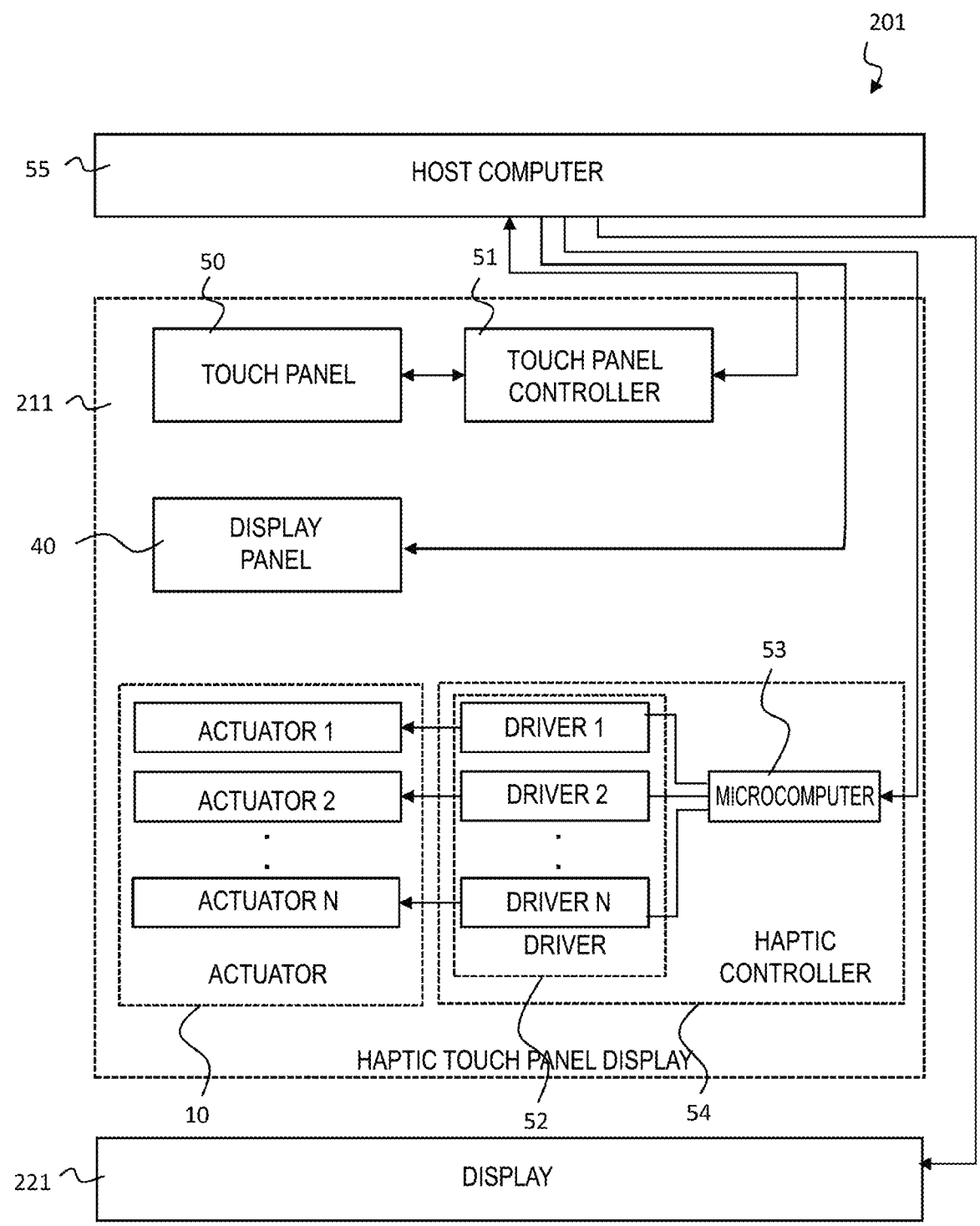
FIG. 4 is a block diagram illustrating a configuration example of the personal computer and the haptic touch panel display according to the first embodiment.

FIG. 4 is a block diagram illustrating a configuration example of the personal computer 201 and the haptic touch panel display 211. The personal computer 201 includes a host computer 55 and controls the haptic touch panel display 211 and the display 221.

The haptic touch panel display 211 further includes a touch panel controller 51 and a haptic controller 54.

The touch panel controller 51 applies a driving signal to the touch panel 50, detects a contact position where the operator touches the surface of the haptic touch panel display 211 with his or her finger or the like, and outputs a contact position detection signal to the host computer 55.

The haptic controller 54 includes drivers 52 corresponding in number to the actuators 10, and a microcomputer 53. Upon receiving the contact position detection signal from the host computer 55, the haptic controller 54 determines the actuator 10 to be driven and a driving voltage as will be described later, and controls the driver 52 so as to drive one or a plurality of actuators 10 close to the contact position.

Figure 5:
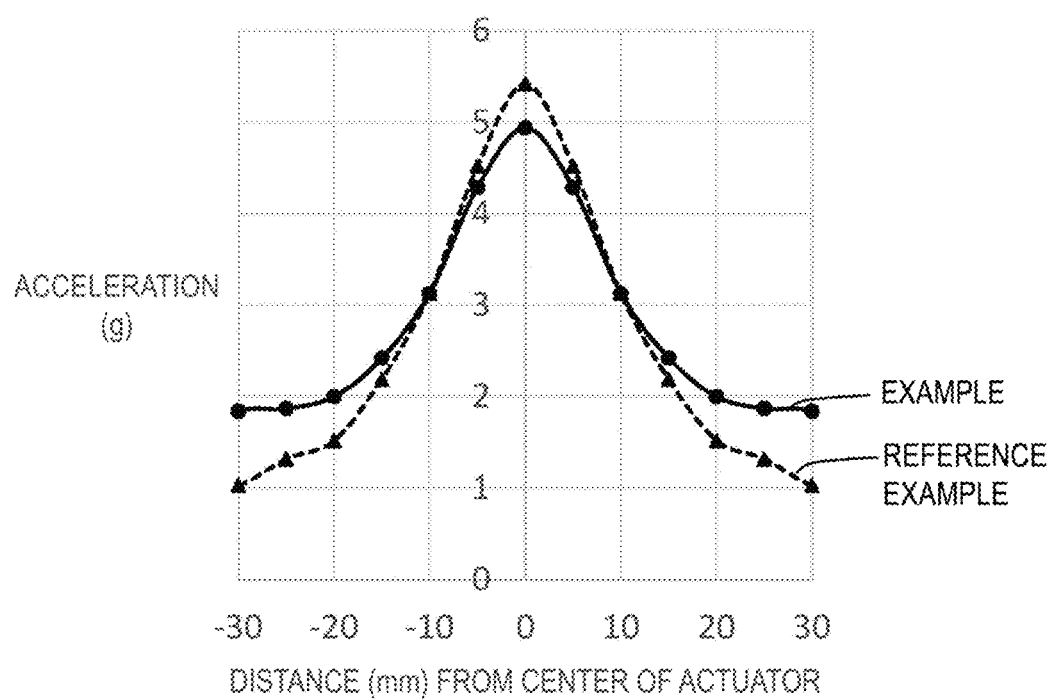
FIG. 5 illustrates an example of a distribution of acceleration detected on the surface of the haptic touch panel display when one actuator is driven.

Next, the operation of the haptic touch panel display 211 according to the present embodiment will be described. FIG. 5 illustrates an example of a distribution of acceleration detected on the surface of the haptic touch panel display when one actuator 10 is driven. A solid line indicates an example of the haptic touch panel display 211 according to the present embodiment (hereinafter referred to as an example), and a dashed line indicates an example of a distribution of acceleration in a haptic touch panel display having the same structure except that the rigid bodies 20 are not provided (hereinafter referred to as a reference example).

As indicated by the solid line in FIG. 5, in the example, the largest acceleration is detected at the center of the actuator 10, and the value of the acceleration decreases as a distance from the center increases. That is, vibration becomes small. However, when the distance from the center is approximately 20 mm, attenuation thereafter becomes small, and even when the distance from the center is approximately 30 mm, an acceleration of approximately 1.8 g is detected.

On the other hand, in the reference example, the value of the acceleration at the center is approximately 10% larger than that in the present embodiment. However, as the distance from the center increases, the acceleration is greatly attenuated. For this reason, the magnitude of the acceleration becomes larger in the example when the distance from the center is 10 mm or more. Further, in the reference example, when the distance from the center is approximately 30 mm, the acceleration is attenuated to approximately 1 g.

It is considered that this means that, with respect to propagation of vibration in the thickness direction in the haptic touch panel display, the attenuation of vibration is smaller in the reference example than in the example due to the absence of the rigid bodies 20. On the other hand, with respect to propagation in a direction perpendicular to the thickness direction in the haptic touch panel display (lateral direction), it is considered that attenuation is smaller in the rigid body 20 than in the display panel when vibration propagates in the lateral direction. That is, according to the example, a maximum vibration intensity with which the display can be excited by the actuator is smaller than that of the reference example (the case where there is no rigid body) by approximately 10%, but an area that can be vibrated with a constant intensity by one actuator can be larger than that of the reference example.

Figure 6:
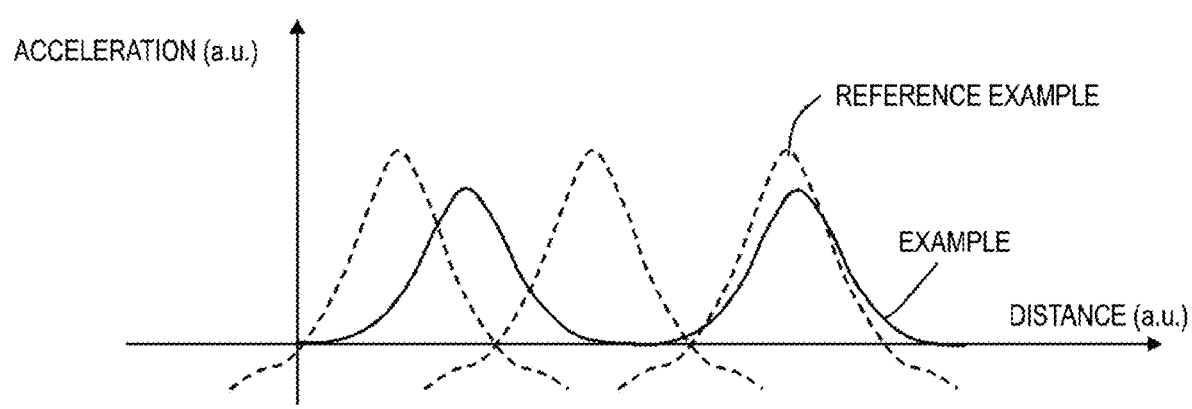
FIG. 6 illustrates a distribution of acceleration when the actuators are disposed one dimensionally based on results illustrated in FIG. 5.

FIG. 6 illustrates a distribution of acceleration in a case where actuators are arranged one dimensionally in the example and the reference example so as to obtain an acceleration of 1.8 g or more based on the results illustrated in FIG. 5. A solid line indicates the example, and a dashed line indicates the reference example. As illustrated in FIG. 6, in the reference example, it is necessary to dispose three actuators, but in the example, the same or similar vibration distribution can be obtained by two actuators. In this manner, according to the haptic touch panel display of the present embodiment, even when the number of actuators disposed on the back surface of the display panel is reduced, the equivalent or comparable vibration can be obtained.

Next, a method of driving the actuator will be described. In the haptic touch panel display according to the present embodiment, the haptic controller 54 drives the actuator closest to a contact position of a finger or the like detected by the touch panel 50 based on a command or an instruction of the host computer 55, and locally vibrates the display panel 40. As described above, according to the haptic touch panel display of the present embodiment, the number of actuators disposed on the back surface of the display panel can be reduced. However, as illustrated in FIGS. 5 and 6, since the intensity of vibration is the highest immediately above each actuator, an interval between the positions where the intensity peaks is wide, and a distribution of the vibration varies greatly as a whole. For example, it is considered that the magnitude of vibration perceived by a finger varies depending on a position at which the finger comes into contact with the surface of the haptic touch panel display. When such a variation in the haptic sensation becomes a problem, a distribution of the vibration intensity may be suppressed by changing the number of actuators to be driven or a voltage for driving the actuators.

Figure 7:
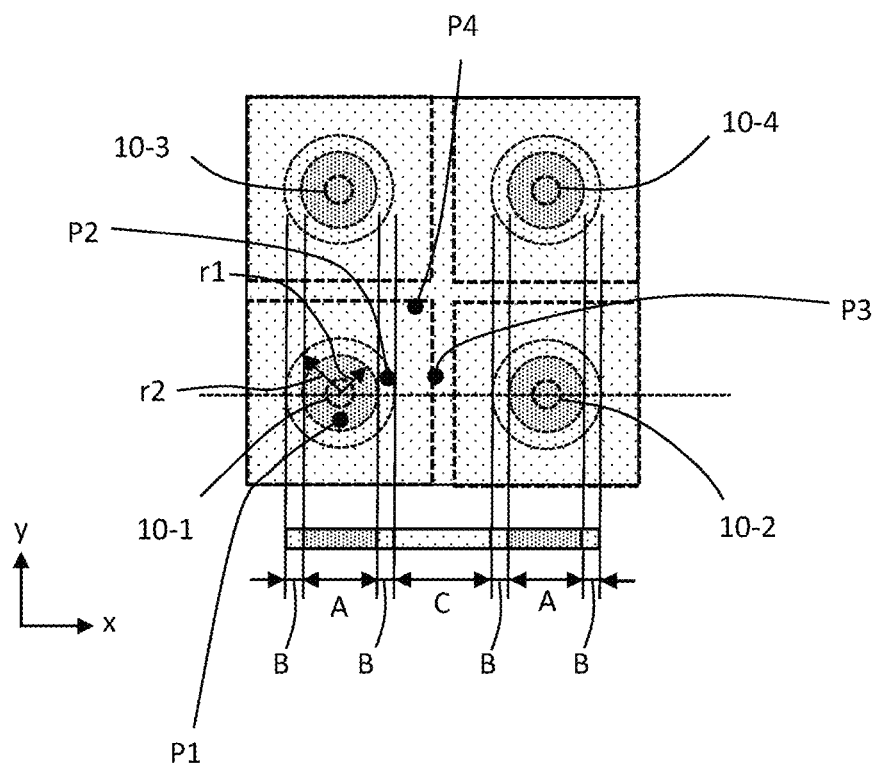
FIG. 7 is a schematic view illustrating a method of driving an actuator.

FIG. 7 is a schematic diagram illustrating an example of a method of driving the actuators 10. Here, the actuators 10 are arranged in two rows and two columns, and the four actuators 10 are denoted by reference numerals 10-1, 10-2, 10-3, and 10-4 to distinguish the four actuators 10 from each other.

For example, when a contact position P1 of a finger or the like is within a region A of a circle having a radius r1 around a point coinciding with the center of the actuator 10-1, a voltage of, for example, 60 V is applied to the actuator 10-1 closest to the contact position P1, and vibration is given to the haptic touch panel display 211. When a contact position P2 is outside the region A and is located in a region B which is within a circle having a radius r2, for example, a voltage of 80 V is applied to the actuator 10-1 closest to the contact position P2, and vibration is given to the haptic touch panel display 211.

On the other hand, when a contact position P3 is located in a region C which is outside the region B, for example, a voltage of 80 V is applied to the actuator 10-1 closest to the contact position P3 and the actuator 10-2 second closest to the contact position P3, and vibration is given to the haptic touch panel display 211.

Such a control method is summarized in the following Table 1. When distances between the contact positions P1 and P2 detected by the touch panel 50 of the haptic touch panel display and the actuator 10-1 closest to the contact positions are a predetermined value (r2) or less, voltages applied to the closest actuator are changed depending on whether a distance d is larger than r1. Thereby, even when the distance between the contact position and the actuator closest to the contact position is large, attenuation of vibration can be compensated for by increasing a voltage to be applied.

When the distance between the contact position detected by the touch panel 50 of the haptic touch panel display and the actuator closest to the contact position is larger than the predetermined value (r2), the closest actuator and the actuator second closest to the contact position are driven. Thus, even when the distance between the contact position and the actuator closest to the contact position is greater, attenuation of vibration can be compensated for by vibrating the display panel 40 using the two actuators.

TABLE 1

| Region | A | B | C |
| --- | --- | --- | --- |
| Distance d from actuator closest to contact position to contact position | d ≤ r1 | d ≤ r2<br>r1 < d ≤ r2 | r2 < d |
| Number of actuators 10 to be driven | 1 | 1 | 2 |
| Applied voltage | 60 V | 80 V | 80 V |

In the above-described example, when the distance d between the contact position and the closest actuator is the predetermined value (r2) or less, a voltage to be applied to the actuator is varied depending on whether the distance d satisfies d<r1 or r1<d<r2. However, the number of division of the distance may be further increased, and a voltage to be applied may be varied. For example, a distance r0 smaller than r1 is set, and a voltage of 60 V may be applied to the actuator when the distance d satisfies r0<d<r1, and a lower voltage, for example, a voltage of 50 V may be applied to the actuator when the distance d satisfies d r0.

Further, as illustrated in FIG. 7, when a position touched by a finger is a contact position P4 close to the actuator 10-3, the actuator 10-3 third closest to the contact position P4 may also be driven. That is, the three actuators 10-1, 10-2, and 10-3 may be driven. Thereby, even when the distance d between the contact position P4 and the closest actuator 10-1 becomes larger, vibration is prevented from being greatly attenuated.

In this manner, according to the haptic touch panel display of the present embodiment, since the rigid body is disposed between the actuator and the back bezel, a vibration region of the actuator can be enlarged by the rigid body, and the display panel can be vibrated in a wider area. For this reason, even when the display panel has a structure in which vibration is easily attenuated therein, vibration of the actuator can be transmitted to a wide region of the surface of the display panel while the attenuation is suppressed. Thus, a haptic touch panel display that can locally present a haptic sensation can be realized while the number of actuators and manufacturing costs are reduced.

Second Embodiment

Figure 8:
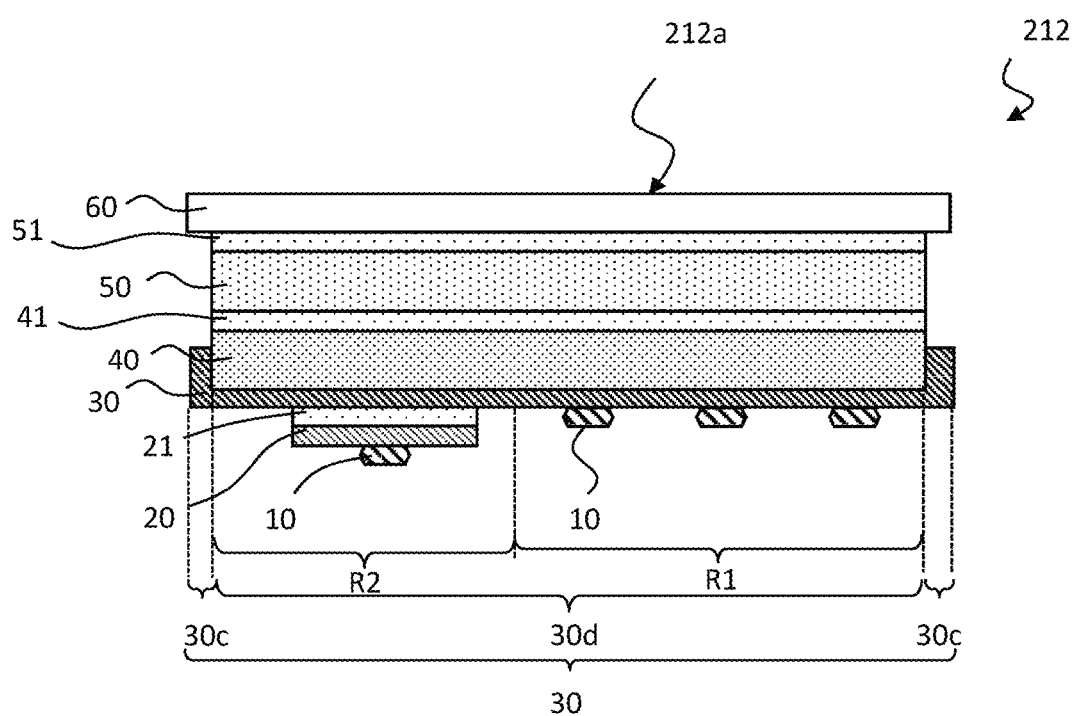
FIG. 8 is a schematic cross-sectional view of a haptic touch panel display according to a second embodiment.

FIG. 8 is a schematic cross-sectional view of a haptic touch panel display 212 according to the present embodiment. The haptic touch panel display 212 is different from the haptic touch panel display 211 according to the first embodiment in that a rigid body is disposed only between some of a plurality of actuators and a back bezel.

As illustrated in FIG. 8, a support portion 30d of a back bezel 30 includes a region R1 and a region R2, and actuators 10 are directly attached to a back surface 30b of the back bezel 30 without interposing rigid bodies 20 therebetween in the region R1. In the region R2 of the support portion 30d, the rigid body 20 is disposed between the back bezel 30 and the actuator 10 as in the first embodiment.

Figure 9:
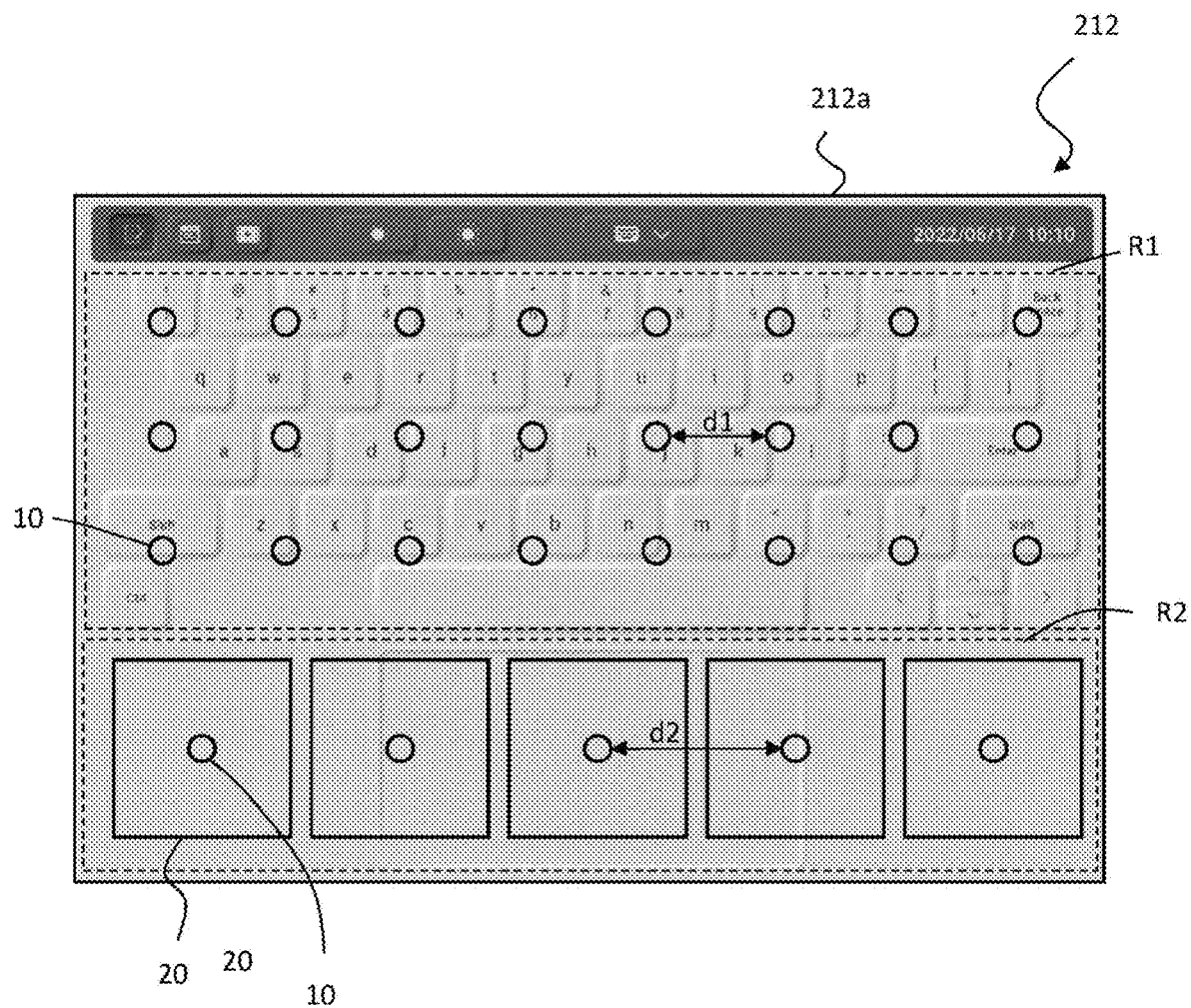
FIG. 9 illustrates an example of the arrangement of rigid bodies and actuators in a state where a keyboard image is displayed on the haptic touch panel display.

FIG. 9 illustrates an example of the arrangement of the rigid bodies 20 and the actuators 10 in a state where a keyboard image is displayed on the haptic touch panel display 212.

As illustrated in FIG. 9, a shortest distance d1 between two adjacent actuators 10 in the actuators 10 disposed in the region R1 is smaller than a shortest distance d2 between two adjacent actuators 10 in the actuators 10 disposed in the region R2. In other words, the actuators 10 are disposed with a relatively high density (the number of actuators per unit area) in the region R1, and the actuators 10 are disposed with a relatively low density in the region R2. The actuators 10 disposed in the region R1 are also referred to as back bezel actuators. The actuators 10 disposed in the region R1 and the actuators 10 disposed in the region R2 may have the same characteristics and the same specifications, or may be different from each other.

As illustrated in FIG. 9, when a software keyboard is displayed on a display surface 212a of the haptic touch panel display 212, alphabet keys, numeric keys, and the like are displayed in the region R1, and thus a contact position touched by an operator's finger also finely changes in the region R1 in accordance with the sizes and arrangement of the keys. For this reason, a large number of actuators 10 are disposed in the region R1 without disposing the rigid bodies 20, and thus a haptic sensation can be locally presented in a narrow region corresponding to the contact position.

On the other hand, a touch pad or the like is displayed in the region R2. From the viewpoint of causing the operator to perceive that a finger is in contact with the touch pad, it is not necessary to finely control a region in which a haptic sensation is presented. For this reason, the number of actuators 10 can be reduced by disposing the rigid bodies 20.

In FIG. 9, the actuators 10 are disposed in three rows and eight columns in the region R1, and the actuators 10 are disposed in one row and five columns in the region R2. The number and arrangement of the actuators 10 and a pitch between adjacent actuators may be determined depending on the sizes, arrangement, and pitches of the keys of the keyboard to be displayed, the size and position of the touch pad, and the like.

In this manner, according to the present embodiment, the size of a region in which one actuator presents a haptic sensation can be varied in the display surface 212a. Thus, a haptic touch panel display having an excellent balance between a function and a cost can be realized.

Third Embodiment

Figure 10:
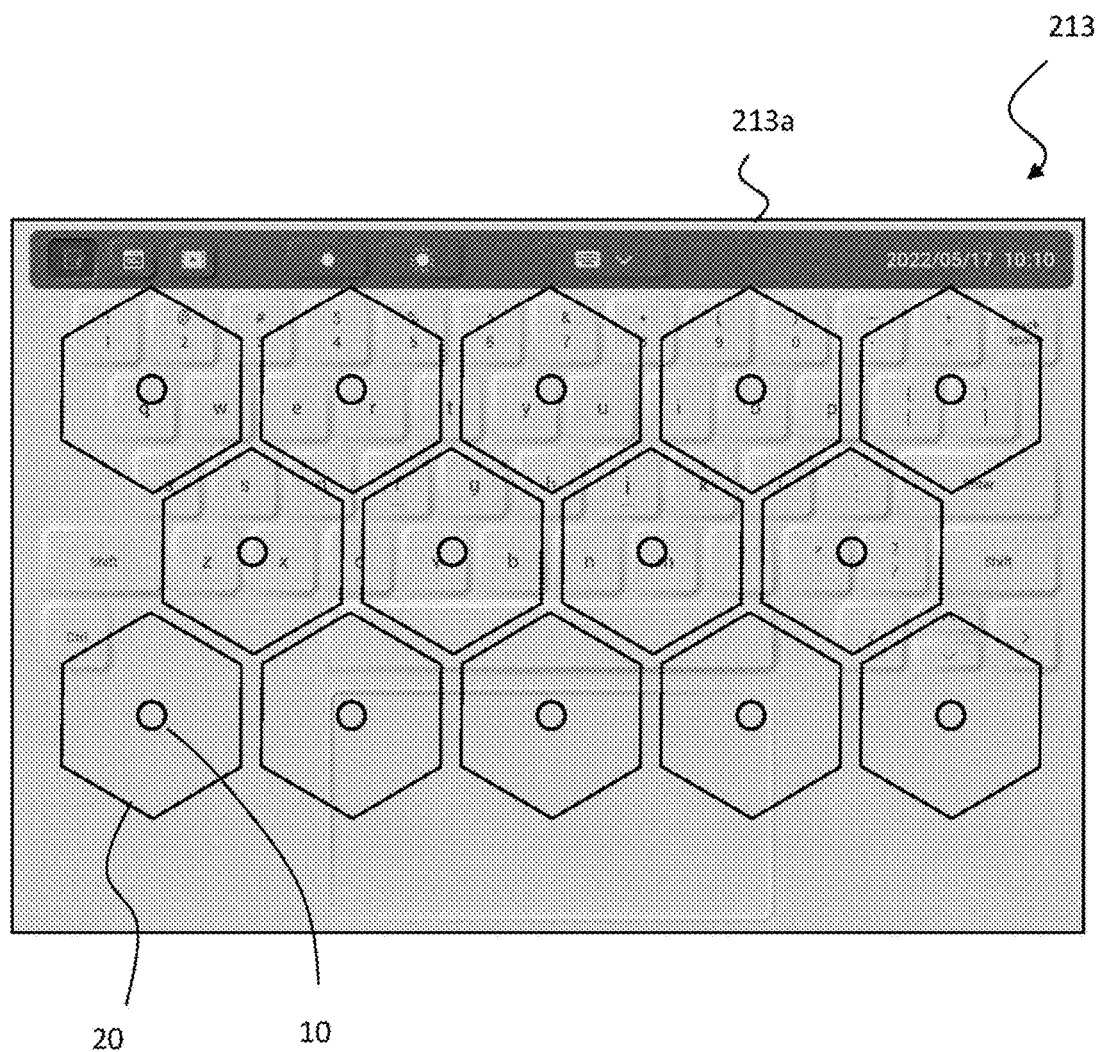
FIG. 10 illustrates an example of the arrangement of rigid bodies and actuators in a state in which a keyboard image is displayed on a haptic touch panel display according to a third embodiment.

FIG. 10 illustrates an example of the arrangement of rigid bodies 20 and actuators 10 in a state where a keyboard image is displayed on a display surface 213a of a haptic touch panel display 213 according to the present embodiment. The haptic touch panel display 213 is different from the haptic touch panel display 211 according to the first embodiment in that the planar shape of the rigid body 20 is hexagonal in a plan view. As illustrated in FIG. 10, the planar shape of the rigid body 20 is, for example, a regular hexagon.

According to the haptic touch panel display 213, since the planar shape of the rigid body 20 is, for example, a regular hexagon, each actuator 10 has the same distance to the adjacent actuator 10 in any direction. In other words, adjacent actuators 10 are concentrically disposed for each actuator 10. When each of the actuators 10 is regarded as a point source of vibration, vibration spreads concentrically, and thus a distribution of the vibration becomes equal to the arrangement of the actuators 10, and the entire display surface 211a can be vibrated more uniformly.

Figure 11:
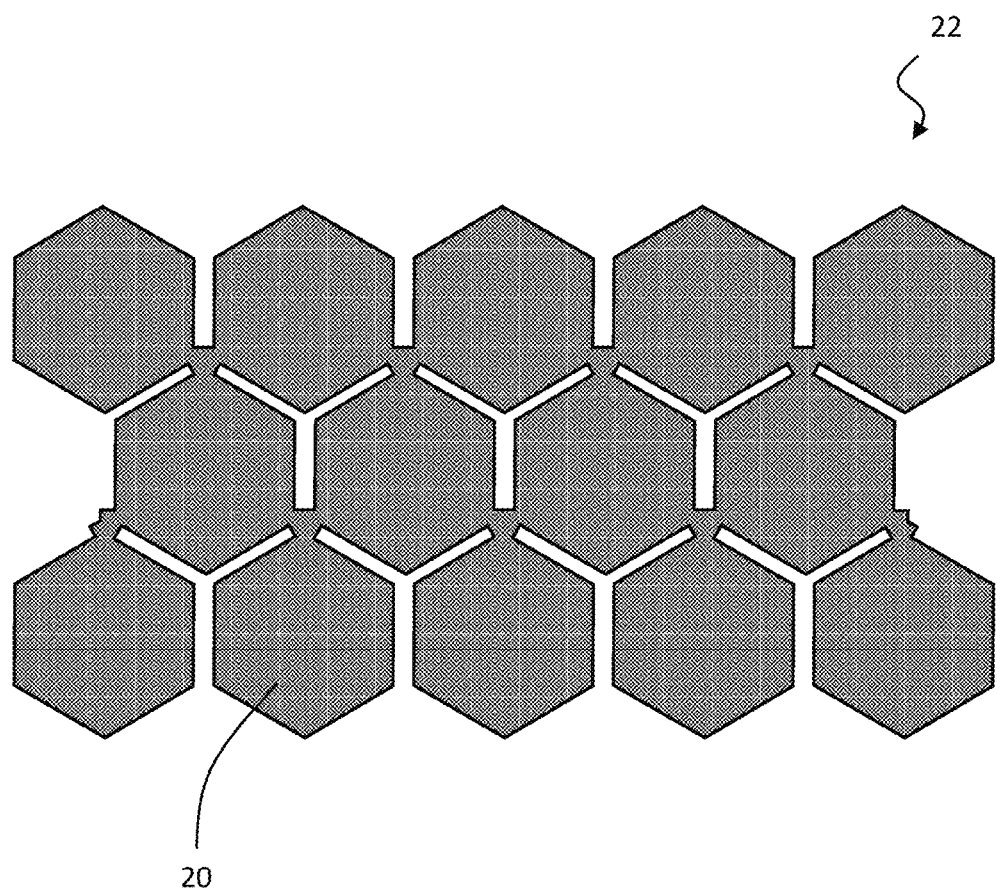
FIG. 11 is a plan view illustrating an example of a rigid aggregate according to the third embodiment.

Although the rigid bodies 20 are independent of each other in the present embodiment, they may be connected to each other to form an aggregate. As illustrated in FIG. 11, the rigid bodies 20 are connected to each other in the vicinity of each vertex which is a part of the outer edge of the hexagon to configure a monolithic rigid aggregate 22. By using the rigid aggregate 22, the manufacturing process can be simplified as compared with a case where a plurality of independent rigid bodies 20 are attached to the back bezel 30.

Fourth Embodiment

Figure 12:
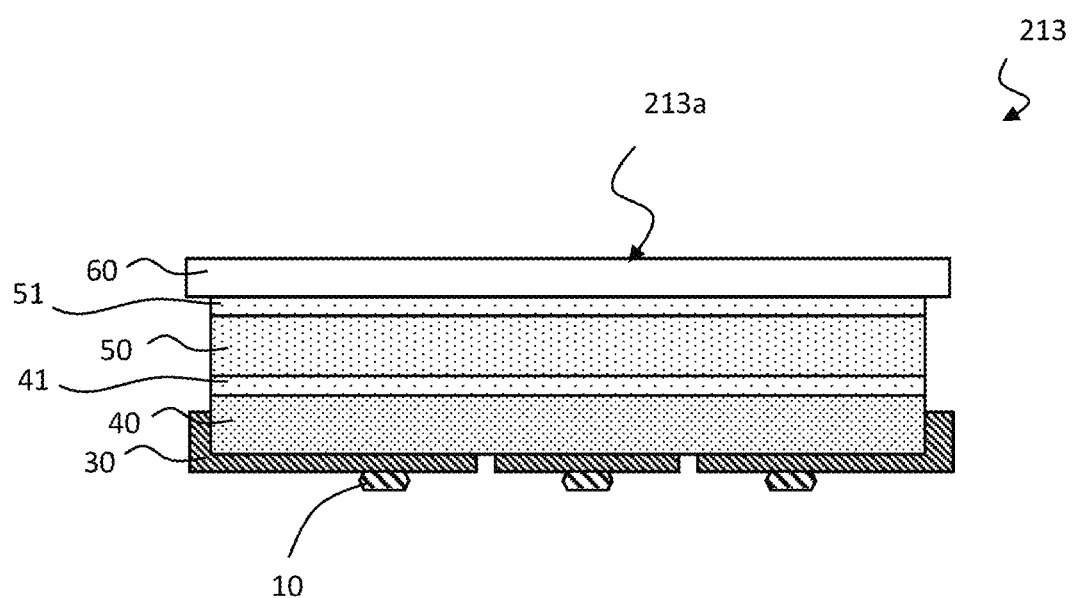
FIG. 12 is a schematic cross-sectional view of a haptic touch panel display according to a fourth embodiment.

FIG. 12 is a schematic cross-sectional view of a haptic touch panel display 214 according to the present embodiment. The haptic touch panel display 214 is different from the haptic touch panel display 211 according to the first embodiment in that rigid bodies are not provided, and slits are provided in a back bezel.

Figure 13:
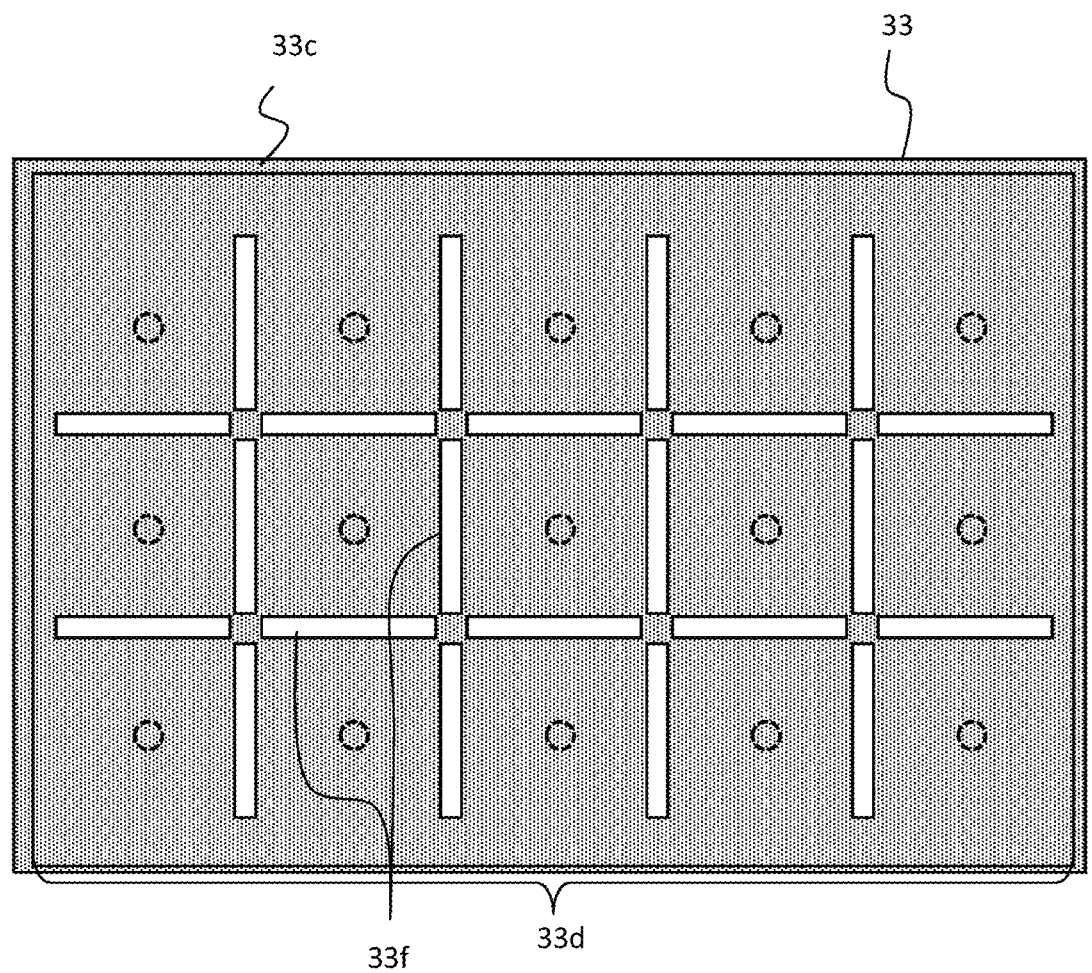
FIG. 13 is a plan view of a back bezel according to the fourth embodiment.

FIG. 13 is a plan view of a back bezel 33. The back bezel 33 includes a frame portion 33c and a support portion 33d as in the first embodiment, and the support portion 33d has a plurality of support regions 33e and a plurality of slits 33f disposed between the support regions 33e.

For example, the support portion 33d is divided into a rectangular shape by the slits 33f extending in the x direction and the y direction, and the vertexes thereof are connected to the adjacent support regions 33e.

The actuator 10 is bonded to the support portion 33d at the center of each support region 33e without interposing the rigid body 20 therebetween.

Since the slits are provided in the support portions 33d of the back bezel 33, vibration transmitted from the actuators 10 is limited to the partitioned support regions 33e. Thereby, the vibration is confined within the support regions 33e, and the vibration from the actuators 10 is made uniform in the support regions 33e and is prevented from being transmitted to the adjacent support regions 33e. Thus, a haptic sensation can be locally presented.

Other Embodiments

The touch panel display driver and the display module of the disclosure are not limited to the above-described embodiments, and various modifications are possible.

The haptic touch panel displays according to the second to fourth embodiments can be suitably realized as a personal computer as described in the first embodiment.

The first to fourth embodiments described above can be implemented in combination as appropriate. For example, the back bezel 33 described in the fourth embodiment may be used in the haptic touch panel display according to the first embodiment. Further, the slits of the back bezel described in the fourth embodiment may be disposed in the region R1 of the back bezel according to the second embodiment. In addition, the first to fourth embodiments may be implemented by combining the features described in two or more embodiments as long as no contradiction occurs.

In addition, as described in the first embodiment, there is no particular limitation on the structures, driving methods, and the like of the display panel 40 and the touch panel 50.

The touch panel display driver and the display module of the disclosure can be also described as follows.

A haptic touch panel display according to a first configuration includes a display panel, a touch panel disposed on an upper surface of the display panel or in the display panel, a back bezel configured to support a lower surface of the display panel, a plurality of actuators, and a plurality of rigid bodies disposed between the back bezel and the plurality of actuators, each of the plurality of rigid bodies being positioned between one of the plurality of actuators and the back bezel.

According to the first configuration, since the rigid body is disposed between the actuator and the back bezel, a vibration region of the actuator can be enlarged by the rigid body, and the display panel can be vibrated in a wider area. Thus, a haptic touch panel display that can locally present a haptic sensation can be realized while the number of actuators and manufacturing costs are reduced.

In a haptic touch panel display according to a second configuration, in the first configuration, each of the plurality of rigid bodies may have a rectangular shape in a plan view.

In a haptic touch panel display according to a third configuration, in the first configuration, each of the plurality of rigid bodies may have a hexagonal shape in a plan view.

In a haptic touch panel display according to a fourth configuration, in the first configuration, each of the plurality of rigid bodies may be connected to an adjacent rigid body of the plurality of rigid bodies at a part of an outer edge to form a monolithic rigid aggregate.

In a haptic touch panel display according to a fifth configuration, in the first configuration, the haptic touch panel display may further include a plurality of back bezel actuators directly connected to the back bezel.

In a haptic touch panel display according to a sixth configuration, in the fifth configuration, a shortest distance between two adjacent back bezel actuators of the plurality of back bezel actuators may be smaller than a shortest distance between two adjacent actuators of the plurality of actuators.

A haptic touch panel display according to a seventh configuration includes a display panel, a touch panel disposed on an upper surface of the display panel or in the display panel, a back bezel configured to support a lower surface of the display panel, and a plurality of actuators, in which the back bezel includes a support portion and a frame portion, the support portion having a support surface and a back surface positioned on a side opposite to the support surface, the support surface facing the lower surface of the display panel, and the frame portion surrounding the support portion, the support portion includes a plurality of support regions and a plurality of slits disposed between the plurality of support regions, and one of the plurality of actuators is positioned on the back surface of each of the plurality of support regions of the support portion.

According to the seventh configuration, since the slits are provided in the support portion of the back bezel, vibration transmitted from the actuators is limited to each partitioned support region. Thereby, the vibration is confined within the support region, and the vibration from the actuators is made uniform in each support region and is prevented from being transmitted to the adjacent support region. Thus, a haptic sensation can be locally presented.

In a haptic touch panel display according to an eighth configuration, in the first or seventh configuration, each of the plurality of actuators may displace the display panel in a thickness direction.

In a haptic touch panel display according to a ninth configuration, in the first or seventh configuration, the haptic touch panel display may further include a touch panel controller, and a haptic controller, in which the touch panel controller detects a contact position on the touch panel where an operator touches a surface of the touch panel, and outputs a contact position detection signal to the host computer, and the haptic controller drives one or a plurality of actuators close to the contact position among the plurality of actuators based on the contact position detection signal.

In a haptic touch panel display according to a tenth configuration, in the ninth configuration, when a distance between the contact position and an actuator closest to the contact position among the plurality of actuators is a predetermined value or less, the haptic controller may drive the actuator closest to the contact position with a voltage varying depending on the distance.

In a haptic touch panel display according to an eleventh configuration, in the ninth configuration, when a distance between the contact position and an actuator closest to the contact position among the plurality of actuators is larger than a predetermined value, the haptic controller may drive the actuator closest to the contact position and an actuator second closest to the contact position among the plurality of actuators.

A personal computer according to a twelfth configuration includes the haptic touch panel display according to any one of the first to eleventh configurations, another display, and a host computer, in which the haptic touch panel display displays an image of a keyboard based on a command or an instruction from the host computer.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A haptic touch panel display comprising:
a display panel;
a touch panel disposed on an upper surface of the display panel or in the display panel;
a back bezel configured to support a lower surface of the display panel;
a plurality of actuators; and
a plurality of rigid bodies disposed between the back bezel and the plurality of actuators, each of the plurality of rigid bodies being positioned between one of the plurality of actuators and the back bezel,
wherein an area of each of the plurality of rigid bodies overlapping with the back bezel is larger than an area of a corresponding one of the plurality of actuators overlapping with the back bezel in a plan view in which the display panel is viewed from an upper side, and
each of the plurality of rigid bodies has a hexagonal shape in the plan view.

2. The haptic touch panel display according to claim 1, wherein each of the plurality of actuators displaces the display panel in a thickness direction.

3. The haptic touch panel display according to claim 1, further comprising:
a touch panel controller; and
a haptic controller,
wherein the touch panel controller detects a contact position on the touch panel where an operator touches a surface of the touch panel, and outputs a contact position detection signal to a host computer, and
the haptic controller drives one or more actuators, in the plurality of actuators, that are near the contact position based on the contact position detection signal.

4. The haptic touch panel display according to claim 3, wherein, when a distance between the contact position and an actuator, in the plurality of actuators, closest to the contact position is a predetermined value or less, the haptic controller drives the actuator closest to the contact position with a voltage varying depending on the distance.

5. The haptic touch panel display according to claim 3, wherein, when a distance between the contact position and an actuator, in the plurality of actuators, closest to the contact position is larger than a predetermined value, the haptic controller drives the actuator closest to the contact position and another actuator, in the plurality of actuators, that is second closest to the contact position.

6. A personal computer comprising:
the haptic touch panel display according to claim 1;
another display; and
a host computer,
wherein the haptic touch panel display displays an image of a keyboard based on a command or an instruction received from the host computer.

7. A haptic touch panel display comprising:
a display panel;
a touch panel disposed on an upper surface of the display panel or in the display panel;
a back bezel configured to support a lower surface of the display panel;
a plurality of actuators; and
a plurality of rigid bodies disposed between the back bezel and the plurality of actuators, each of the plurality of rigid bodies being positioned between one of the plurality of actuators and the back bezel,
wherein an area of each of the plurality of rigid bodies overlapping with the back bezel is larger than an area of a corresponding one of the plurality of actuators overlapping with the back bezel in a plan view in which the display panel is viewed from an upper side, and
each of the plurality of rigid bodies is connected to an adjacent rigid body of the plurality of rigid bodies at a part of an outer edge to form a monolithic rigid aggregate.

8. A haptic touch panel display comprising:
a display panel;
a touch panel disposed on an upper surface of the display panel or in the display panel;
a back bezel configured to support a lower surface of the display panel;
a plurality of actuators;
a plurality of back bezel actuators directly connected to the back bezel; and
a plurality of rigid bodies disposed between the back bezel and the plurality of actuators, each of the plurality of rigid bodies being positioned between one of the plurality of actuators and the back bezel,
wherein an area of each of the plurality of rigid bodies overlapping with the back bezel is larger than an area of a corresponding one of the plurality of actuators overlapping with the back bezel in a plan view in which the display panel is viewed from an upper side.

9. The haptic touch panel display according to claim 8, wherein a shortest distance between two adjacent back bezel actuators of the plurality of back bezel actuators is smaller than a shortest distance between two adjacent actuators of the plurality of actuators.

10. A haptic touch panel display comprising:
a display panel;
a touch panel disposed on an upper surface of the display panel or in the display panel;
a back bezel configured to support a lower surface of the display panel; and
a plurality of actuators,
wherein the back bezel includes a support portion and a frame portion, the support portion having a support surface and a back surface positioned on a side opposite the support surface, the support surface facing the lower surface of the display panel, and the frame portion surrounding the support portion,
the support portion includes a plurality of support regions and a plurality of slits disposed between the plurality of support regions, and
one of the plurality of actuators is positioned on the back surface of each of the plurality of support regions of the support portion.

* * * * *